US012597634B2

(12) United States Patent
Mima

(10) Patent No.: US 12,597,634 B2
(45) Date of Patent: Apr. 7, 2026

(54) PRODUCING METHOD FOR LITHIUM-ION SECONDARY BATTERY

(71) Applicant: PRIME PLANET ENERGY & SOLUTIONS, INC., Tokyo (JP)

(72) Inventor: Kazuma Mima, Toyota (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 490 days.

(21) Appl. No.: 18/135,382

(22) Filed: Apr. 17, 2023

(65) Prior Publication Data

US 2023/0411673 A1 Dec. 21, 2023

(30) Foreign Application Priority Data

May 26, 2022 (JP) ................................. 2022-085951

(51) Int. Cl.
*H01M 10/0525* (2010.01)
*H01M 4/04* (2006.01)
(Continued)

(52) U.S. Cl.
CPC ..... *H01M 10/0525* (2013.01); *H01M 4/0404* (2013.01); *H01M 4/661* (2013.01); *H01M 10/049* (2013.01); *H01M 10/0568* (2013.01); *H01M 10/446* (2013.01); *H01M 50/10* (2021.01); *H01M 50/609* (2021.01); *H01M 2004/027* (2013.01)

(58) Field of Classification Search
CPC ........... H01M 10/0525; H01M 10/049; H01M 10/0568; H01M 10/446; H01M 50/10; H01M 50/609; H01M 4/0404; H01M 4/661; H01M 2004/027
See application file for complete search history.

(56) References Cited

U.S. PATENT DOCUMENTS

2005/0158625 A1 7/2005 Im et al.
2006/0228624 A1 10/2006 Issaev et al.
(Continued)

FOREIGN PATENT DOCUMENTS

EP 1 555 705 A2 7/2005
EP 2 287 947 A1 2/2011
(Continued)

*Primary Examiner* — Jane J Rhee
(74) *Attorney, Agent, or Firm* — Finnegan, Henderson, Farabow, Garrett, and Dunner, LLP

(57) ABSTRACT

A producing method for a lithium-ion secondary battery includes a positive-electrode-plate producing step of producing a positive electrode plate having a positive active material layer on a surface of a positive current collecting foil, an electrode-body producing step of producing an electrode body provided with the positive electrode plate and a negative electrode plate, a housing step of housing the electrode body inside a battery case, an injecting step of injecting non-aqueous electrolytic solution into the battery case housed with the electrode body to produce an injection-completed battery, and an initial charging step of initially charging the injection-completed battery. The injecting step is to inject the non-aqueous electrolytic solution into the battery case housed with the electrode body in which a water content of the positive active material layer is 100 ppm or more.

2 Claims, 7 Drawing Sheets

(51) Int. Cl.

| | |
|---|---|
| *H01M 4/66* | (2006.01) |
| *H01M 10/04* | (2006.01) |
| *H01M 10/0568* | (2010.01) |
| *H01M 10/44* | (2006.01) |
| *H01M 50/10* | (2021.01) |
| *H01M 50/609* | (2021.01) |
| *H01M 4/02* | (2006.01) |

(56)  References Cited

U.S. PATENT DOCUMENTS

| | | | |
|---|---|---|---|
| 2011/0068293 A1 | 3/2011 | Fujino et al. | |
| 2017/0125844 A1 | 5/2017 | Nakagawa | |
| 2019/0207215 A1* | 7/2019 | Tokoro | H01M 10/052 |
| 2022/0098054 A1 | 3/2022 | Lee et al. | |

FOREIGN PATENT DOCUMENTS

| | | | |
|---|---|---|---|
| EP | 3 892 590 A1 | 10/2021 |
| JP | 2014-049390 A | 3/2014 |
| JP | 2015-090860 A | 5/2015 |
| JP | 2018-060689 A | 4/2018 |
| JP | 2020-194845 A | 12/2020 |

* cited by examiner 63P
(64,65,66,69)

63
(64,65,66)

61b
61
61c

PRODUCING METHOD FOR LITHIUM-ION SECONDARY BATTERY

CROSS-REFERENCE TO RELATED APPLICATIONS

This application is based upon and claims the benefit of priority from the prior Japanese Patent Application No. 2022-085951, filed May 26, 2022, the entire contents of which are incorporated herein by reference.

BACKGROUND

Technical Field

The present disclosure relates to a producing method for a lithium-ion secondary battery.

Related Art

JP Patent Application Publication No. 2018-060689A has disclosed a producing method for a lithium-ion secondary battery including a positive electrode plate provided with a positive active material layer on a surface of a positive current collecting foil formed of an aluminum foil, a negative electrode plate, and non-aqueous electrolytic solution including $LiPF_6$.

SUMMARY

Technical Problems

Such as boost charging, when a large electric load is energized to the lithium-ion secondary battery, which includes the positive electrode plate provided with the positive active material layer on the surface of the positive current collecting foil that is formed of the aluminum foil, the negative electrode plate, and the non-aqueous electrolytic solution, there is a case that some local points on the positive current collecting foil exhibit high potential. Then, these local points with high potential could be corroded to bring about liquation of Al (aluminum) from surfaces of the points. Deposition of the thus liquated aluminum on a surface of the negative electrode could cause internal short-circuit. Specifically, in a lithium-ion secondary battery at an initial stage of use, liquation of aluminum might be caused due to the above-mentioned corrosion since a surface of the positive current collecting foil has not been well coated with $AlF_3$ that has high corrosion resistance.

To address the above problem, in a lithium-ion secondary battery of the JP Patent Application Publication No. 2018-060689A, $LiBF_4$ and LiFOB are made to be added to the non-aqueous electrolytic solution as additives for promoting formation of $AlF_3$ coating on the surface of a positive current collecting foil. However, these additives are expensive, and there is still a possibility of generation of Al liquation due to the corrosion since formation of the $AlF_3$ coating is not enough at the initial stage of use in a case of performing the high-load energization such as boost charging.

The present disclosure has been made in view of the above circumstances, and has a purpose of providing a producing method for a lithium-ion secondary battery that can achieve reduction in "Al liquation from a surface of a positive current collecting foil when high-load energization is performed at an initial stage of use."

Means of Solving the Problems (1) One aspect of the present disclosure is a producing method for a lithium-ion secondary battery comprising a positive electrode plate provided with a positive active material layer on a surface of a positive current collecting foil formed of an aluminum foil, a negative electrode plate, non-aqueous electrolytic solution including $LiPF_6$, and a battery case to house the positive electrode plate, the negative electrode plate, and the non-aqueous electrolytic solution, the producing method includes: positive-electrode-plate producing of producing the positive electrode plate having the positive active material layer on the surface of the positive current collecting foil; electrode-body producing of producing an electrode body provided with the positive electrode plate and the negative electrode plate; housing the electrode body in the battery case; injecting the non-aqueous electrolytic solution into the battery case housed with the electrode body to produce an injection-completed battery; and initial charging of initially charging the injection-completed battery, wherein the injecting is to inject the non-aqueous electrolytic solution into the battery case housed with the electrode body, in which a water content of the positive active material layer is 100 ppm or more.

In the process of the injecting according to the above-mentioned producing method for the lithium-ion secondary battery, the non-aqueous electrolytic solution is injected into the battery case housed with the electrode body, in which the water content (water content rate) of the positive active material layer is 100 ppm or more. The injecting process is thus performed in a state where the water content of the positive active material layer is 100 ppm or more, so that coating of $AlF_3$ having high corrosion resistance can be appropriately formed on the surface of the positive current collecting foil during a term after injecting the electrolytic solution into the battery case and before shipment of the battery. Especially in the process of the initial charging, coating formation reaction of $AlF_3$ is promoted, thereby enhancing the corrosion resistance of the surface of the positive current collecting foil. Herein, in the conventional producing method, the positive active material layer is produced such that the water included in the positive active material layer is made to be as less as possible, and thus the water content of the positive active material layer used to be far less than 100 ppm.

The lithium-ion secondary battery produced as above has higher corrosion resistance than a conventional lithium-ion secondary battery on the surface of the positive current collecting foil at the time when the lithium-ion secondary battery has been completed and has got ready for shipment. Accordingly, in the lithium-ion secondary battery produced by the above-mentioned producing method, "Al liquation from the surface of the positive current collecting foil when the high-load energization is performed at the initial stage of use" can be reduced as compared with the conventional lithium-ion secondary battery.

By a series of reaction in the following (a) and (b), coating of $AlF_3$ having the high corrosion resistance is formed on the surface of the positive current collecting foil (aluminum foil). The surface of the positive current collecting foil (the aluminum foil) used in the process of the positive-electrode-plate producing is coated with $Al_2O_3$ which is an oxide film. Therefore, the surface of the positive current collecting foil included in the electrode body which is to be applied with the injecting process, is also coated with $Al_2O_3$.

(a) After injecting the electrolytic solution into the battery case in the injecting process, $H_2O$ included in the positive electrode plate inside the battery case makes reaction with $LiPF_6$ in the electrolytic solution, so that HF is formed.

$$LiPF_6 + H_2O \rightarrow LiF + POF_3 + 2HF \qquad \text{Formula 1:}$$

(b) The thus formed HF makes reaction with the $Al_2O_3$ coating on the surface of the positive current collecting foil, and thereby coating of $AlF_3$ is formed on the surface of the positive current collecting foil.

$$Al_2O_3 + 6HF \rightarrow 2AlF_3 + 3H_2O \qquad \text{Formula 2:}$$

(2) Further, in the producing method for the lithium-ion secondary battery according to the above (1), preferably, the injecting is to inject the non-aqueous electrolytic solution into the battery case housed with the electrode body in which the water content of the positive active material layer is within a range from 100 ppm or more to less than 500 ppm.

The more the water content of the positive active material layer is increased at the time of performing the injecting process, the more easily the $AlF_3$ coating is formed on the surface of the positive current collecting foil, thus enhancing the corrosion resistance on the surface of the positive current collecting foil. However, too much increase in the water content of the positive active material layer could cause decline in an initial capacity of the subject lithium-ion secondary battery. Specifically, when the water content of the positive active material layer is 500 ppm or more, the initial capacity of the lithium-ion secondary battery largely declines. Therefore, the water content of the positive active material layer at the time of performing the injecting process is preferably within a range from 100 ppm or more to less than 500 ppm.

In response to the above, in the injecting process in the above-mentioned producing method, the non-aqueous electrolytic solution is injected into the battery case housed with the electrode body, in which the water content of the positive active material layer is within a range from 100 ppm or more to less than 500 ppm. The lithium-ion secondary battery is produced in this manner, so that it is possible to reduce "liquation of Al from the surface of the positive current collecting foil when the high-load energization is performed at the initial stage of using the subject battery" and it is possible to restrain decline in the initial capacity of the subject battery.

(3) Further, in the producing method for the lithium-ion secondary battery according to the above (2), preferably, the producing method includes water-content adjusting between the positive-electrode-plate producing and the injecting to adjust the water content of the positive active material layer to be within the range of 100 ppm or more to less than 500 ppm.

In the process of the water-content adjusting provided between the positive-electrode-plate producing process and the injecting process in the above-mentioned producing method, the water content of the positive active material layer is adjusted to be within a range from 100 ppm or more to less than 500 ppm. Thereby, the water content (water content rate) of the positive active material layer at the time of starting the injecting process is made to be within the range from 100 ppm or more to less than 500 ppm. Namely, the above-mentioned producing method includes the water-content adjusting process between the positive-electrode-plate producing process and the injecting process to adjust the water content of the positive active material layer at the time of starting the injecting process to be within the range from 100 ppm or more to less than 500 ppm. Thereafter, in the injecting process, the non-aqueous electrolytic solution is injected into the battery case housed with the electrode body, in which the water content of the positive active material layer is within the range from 100 ppm or more to less than 500 ppm.

One example of the water-content adjusting process is a process of firstly leaving a positive electrode plate produced in the positive-electrode-plate producing process for a predetermined term under a certain environment such as an environment of 25° C. with 50% RH so that the positive active material layer absorbs water. Thereafter, an electrode body including this positive electrode plate is heated and dried for a predetermined term directly before the injecting process so that the water content of the positive active material layer included in the subject electrode body is adjusted to be within the range from 100 ppm or more to less than 500 ppm. When the electrode body is to be heated and dried directly before the injecting process, the electrode body is preferably housed in the battery case to be in a standby state for the injecting process.

DETAILED DESCRIPTION OF THE EXEMPLARY EMBODIMENTS

Figure 1:
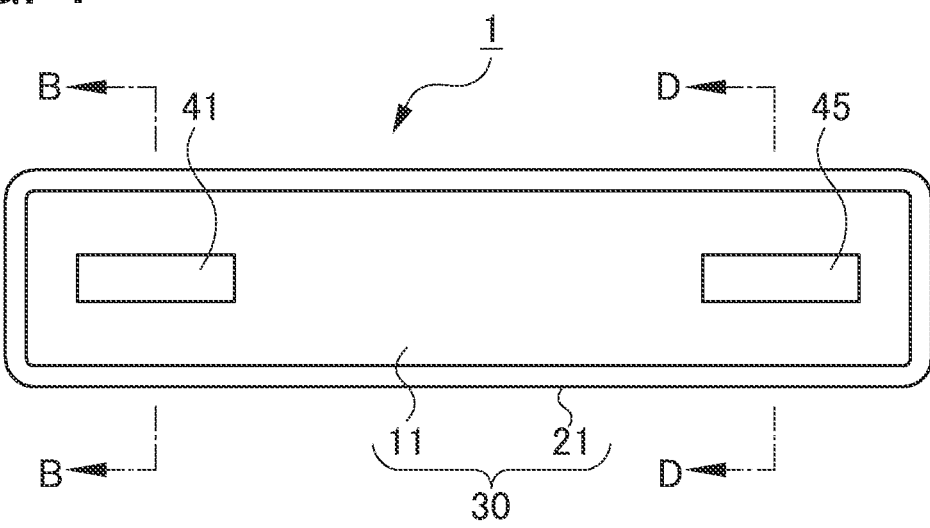
FIG. 1 is a top plan view of a lithium-ion secondary battery in an embodiment.
Figure 2:
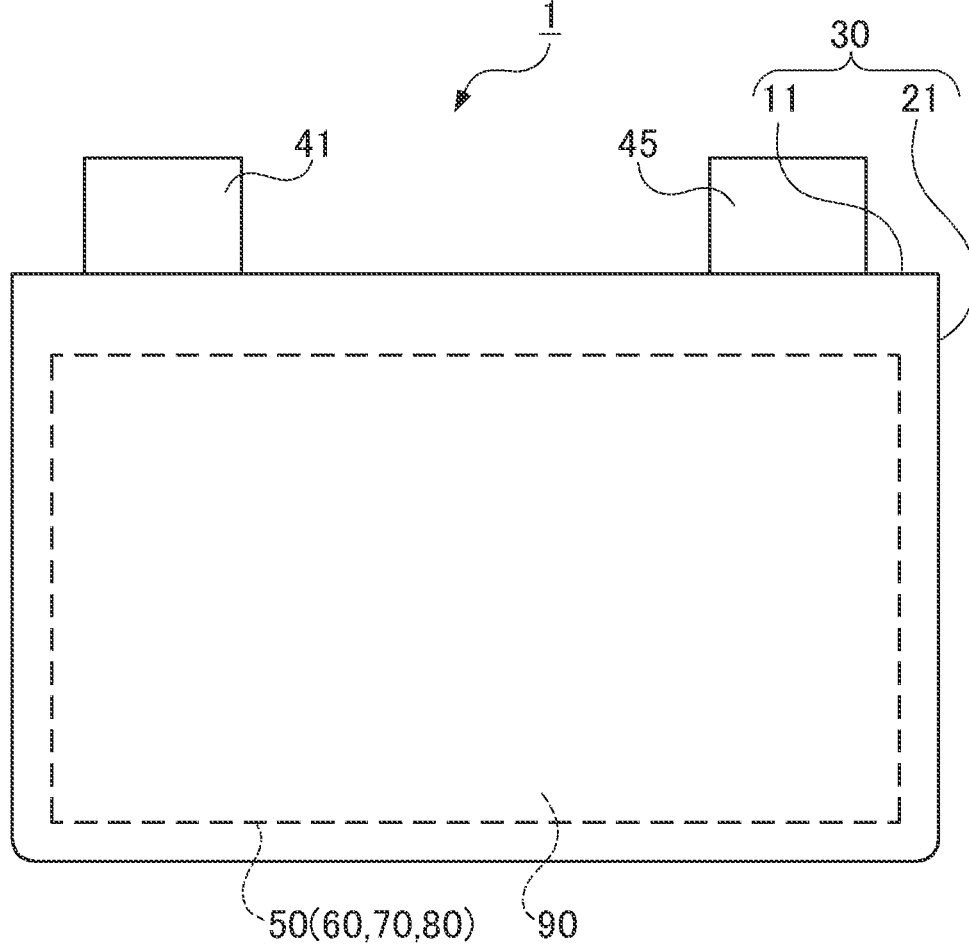
FIG. 2 is a front view of the lithium-ion secondary battery.

An embodiment of the present disclosure is now explained. A lithium-ion secondary battery 1 according to the present embodiment is provided with a battery case 30, an electrode body 50 housed in the battery case 30, a positive electrode terminal member 41, and a negative electrode terminal member 45 (see FIG. 1 and FIG. 2). The battery case 30 is a metal-made hard case of a rectangular-parallelepiped box-like shape. This battery case 30 is provided with a metal-made case body 21 of a bottomed rectangular cylindrical shape and a metal-made lid 11 of a rectangular plate-like shape for closing an opening of the case body 21 (see FIG. 1 and FIG. 2).

The lid 11 is formed with two rectangular-cylindrical-shaped through holes of a first through hole and a second through hole (not shown). The positive electrode terminal member 41 is inserted in the first through hole and the negative electrode terminal member 45 is inserted in the second through hole (see FIG. 1 and FIG. 2). Herein, a cylindrical insulation member (not shown) is interposed between an inner circumferential surface of the first through hole of the lid 11 and an outer circumferential surface of the positive electrode terminal member 41, and another cylindrical insulation member is interposed between an inner circumferential surface of the second through hole of the lid

11 and an outer circumferential surface of the negative electrode terminal member 45.

Figure 8:
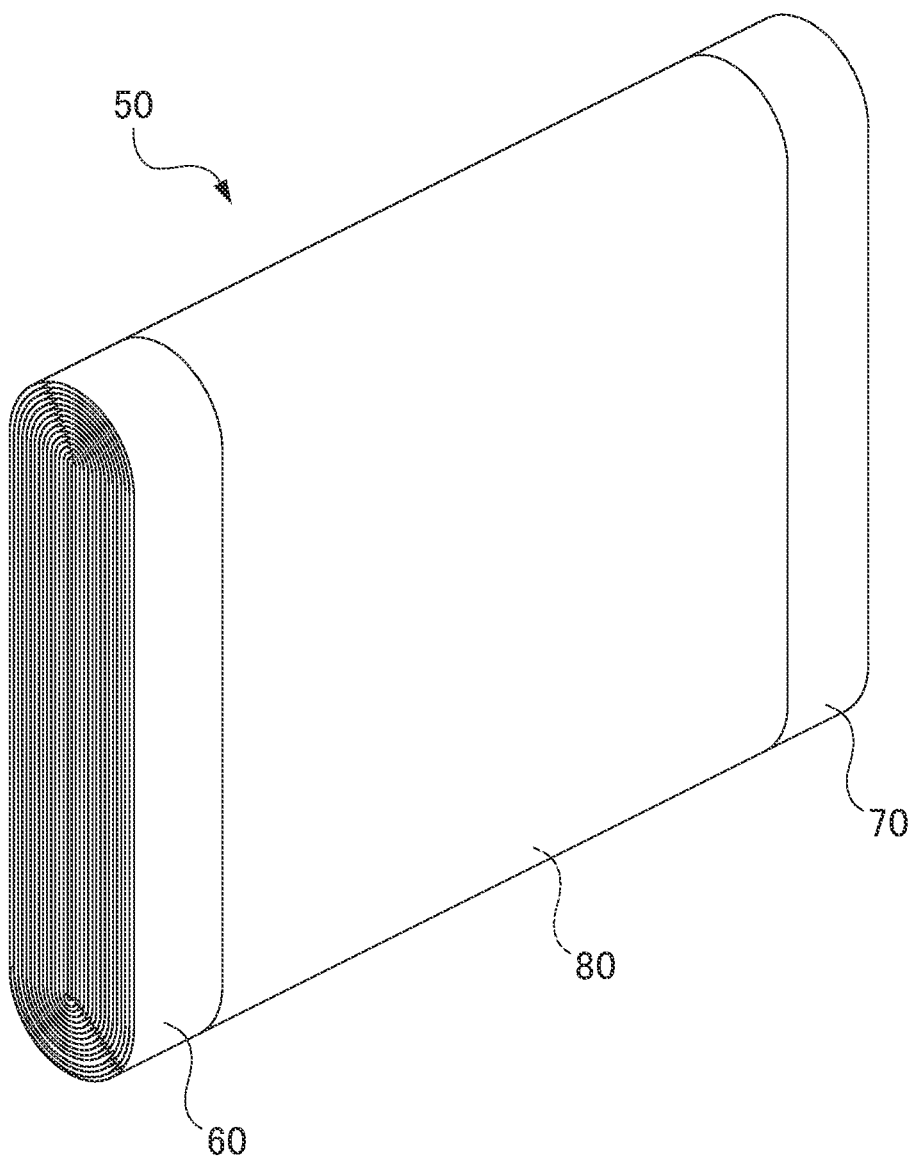
FIG. 8 is a perspective view of an electrode body of the lithium-ion secondary battery.

The electrode body 50 includes a positive electrode plate 60, a negative electrode plate 70, and a separator 80 interposed between the positive electrode plate 60 and the negative electrode plate 70. Specifically, the electrode body 50 is provided with the strip-shaped positive electrode plate 60, the strip-shaped negative electrode plate 70, and the strip-shaped separator 80, and is a wound electrode body formed by winding the positive electrode plate 60 and the negative electrode plate 70 with the separator 80 interposed therebetween (see FIG. 8). Further, inside the electrode body 50, non-aqueous electrolytic solution 90 is contained (see FIG. 2). The non-aqueous electrolytic solution 90 is also contained on a bottom side of the battery case 30. The positive electrode plate 60 of the electrode body 50 is connected to the positive electrode terminal member 41 in the battery case 30. Further, the negative electrode plate 70 is connected to the negative electrode terminal member 45 in the battery case 30.

Figure 6:
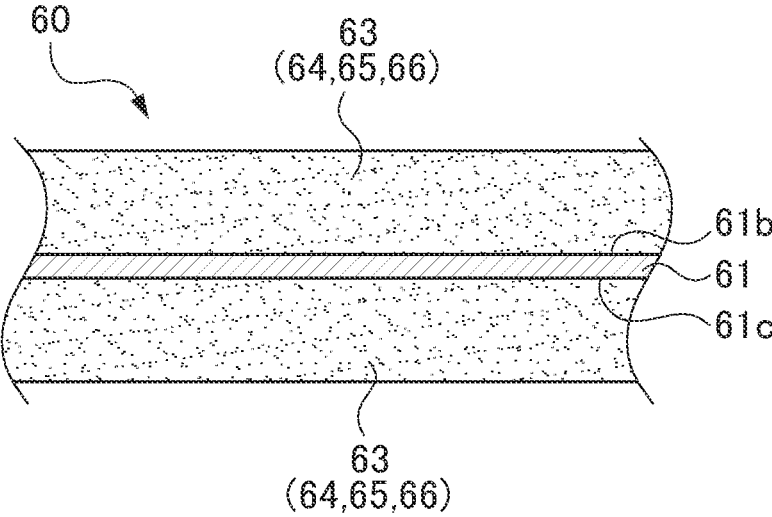
FIG. 6 is a sectional view of a positive electrode plate of the lithium-ion secondary battery.

The positive electrode plate 60 includes a positive current collecting foil 61 formed of an aluminum foil and positive active material layers 63 laminated on surfaces (that is, a first surface 61$b$ and a second surface 61$c$) of the positive current collecting foil 61 (see FIG. 6). The positive active material layer 63 includes positive active material particles 64, a binder 65, and a conductive material 66. In the present embodiment, as the positive active material particles 64, lithium transition metal composite oxide particles, specifically, particles of $Li(Ni_{1/3}Mn_{1/3}Co_{1/3})O_2$ are used. Further, PVDF is used as the binder 65, and acetylene black is used as the conductive material 66.

Figure 7:
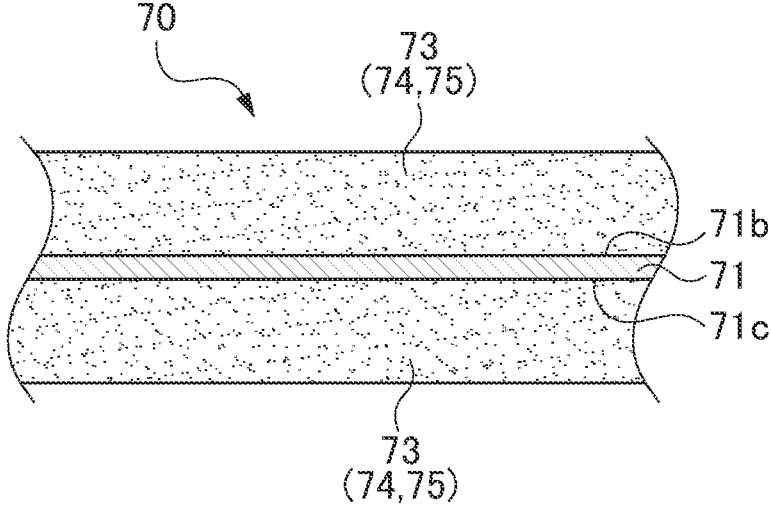
FIG. 7 is a sectional view of a negative electrode plate of the lithium-ion secondary battery.

The negative electrode plate 70 includes a negative current collecting foil 71 formed of a copper foil and negative active material layers 73 laminated on surfaces (that is, a first surface 71$b$ and a second surface 71$c$) of the negative current collecting foil 71 (see FIG. 7). The negative active material layer 73 includes negative active material particles 74 and a binder 75. In the present embodiment, graphite particles are used as the negative active material particles 74. Further, CMC (carboxymethyl cellulose) and SBR (styrene-butadiene rubber) are used as the binder 75.

The separator 80 includes a porous resin sheet made of polyolefin and a thermal resistance layer formed of thermally resistant particles which is formed on a surface of the porous resin sheet. In the present embodiment, a porous resin sheet of three-layer structure in which a porous polyethylene layer is interposed between two porous polypropylene layers is used as the porous resin sheet. Further, the non-aqueous electrolytic solution 90 includes organic solvent (specifically, ethylene carbonate, ethyl methyl carbonate, and dimethyl carbonate) and $LiPF_6$.

Figure 3:
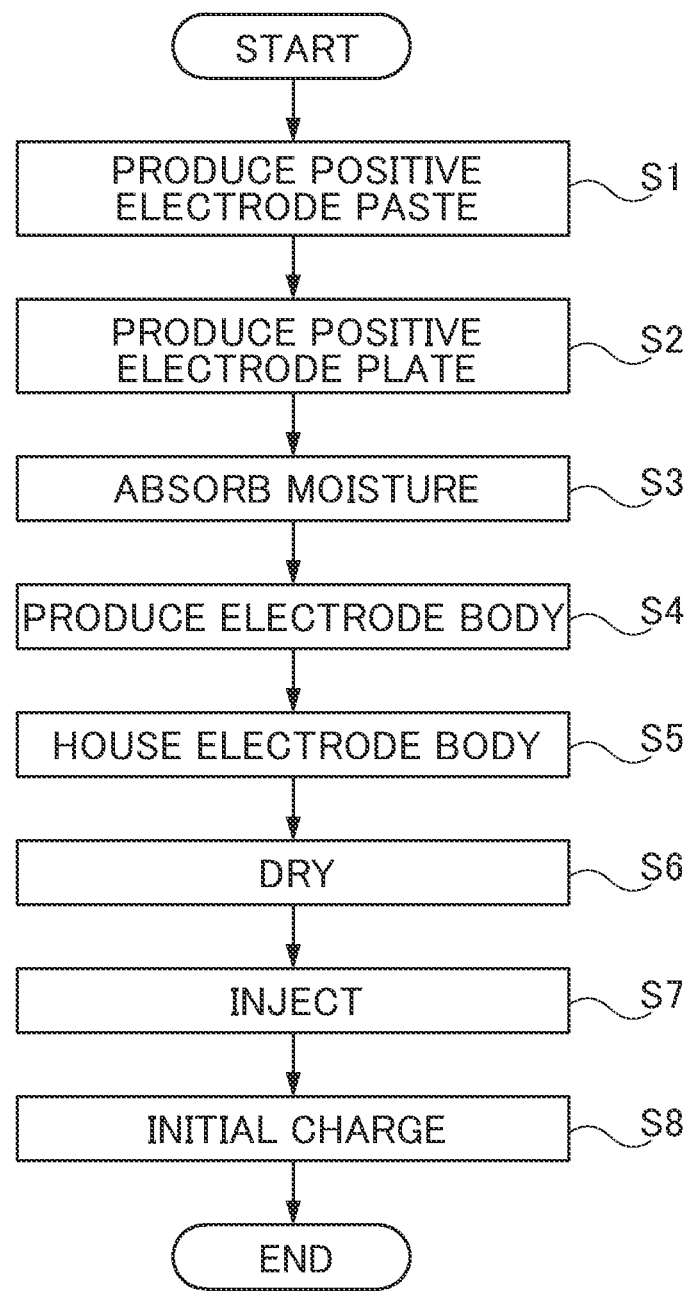
FIG. 3 is a flow chart indicating steps of a producing method for the lithium-ion secondary battery.
Figure 4:
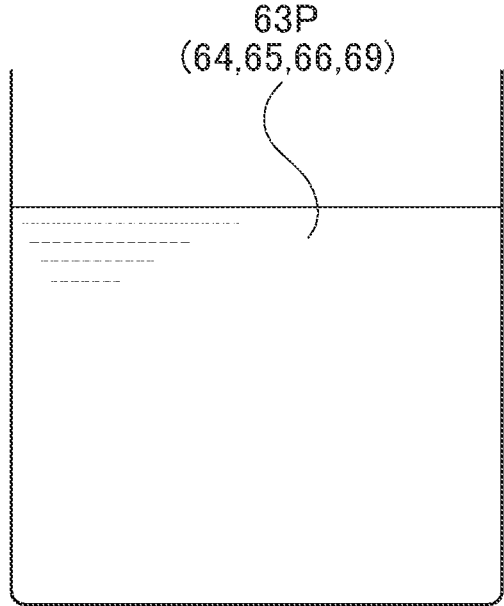
FIG. 4 is an explanatory view for explaining the producing method for the lithium-ion secondary battery.

Next, a producing method for the lithium-ion secondary battery 1 according to the embodiment is explained. FIG. 3 is a flow chart indicating steps of the producing method for the lithium-ion secondary battery 1. Firstly, in step S1 of a positive electrode paste producing step, a positive electrode paste 63P is produced. Specifically, the positive active material particles 64, the binder 65, the conductive material 66 and a solvent 69 are mixed to produce the positive electrode paste 63P (see FIG. 4). In the present embodiment, as the positive active material particles 64, lithium transition metal composite oxide particles, specifically, particles of $Li(Ni_{1/3}Mn_{1/3}Co_{1/3})O_2$ are used. Further, as the binder 65, PVDF is used, and as the conductive material 66, acetylene black is used.

Figure 5:
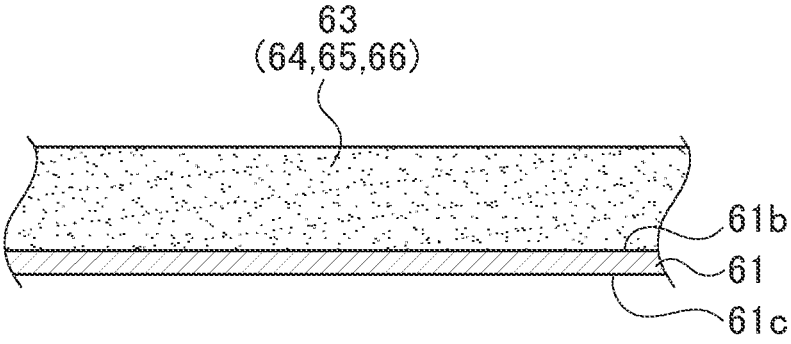
FIG. 5 is another explanatory view for explaining the producing method for the lithium-ion secondary battery.

Subsequently, in step S2 of a positive electrode plate producing step, the positive electrode plate 60 provided with the positive active material layers 63 on the surfaces (that is, the first surface 61$b$ and the second surface 61$c$) of the positive current collecting foil 61 is produced. Specifically, the positive electrode paste 63P is firstly applied on the first surface 61$b$ of the strip-shaped positive current collecting foil 61. Thus, a positive electrode paste layer formed of the positive electrode paste 63P is formed on the first surface 61$b$ of the positive current collecting foil 61. Next, the positive electrode paste 63P, specifically, the positive electrode paste layer formed of the positive electrode paste 63P, which has been applied on the first surface 61$b$ of the positive current collecting foil 61, is dried. Thereby, the solvent 69 is evaporated from the positive electrode paste layer formed of the positive electrode paste 63P, and thus the positive active material layer 63 is formed on the first surface 61$b$ of the positive current collecting foil 61 (see FIG. 5). Similarly, the positive active material layer 63 is formed also on the second surface 61$c$ of the positive current collecting foil 61 to produce the strip-shaped positive electrode plate 60 (see FIG. 6). Herein, the first surface 61$b$ and the second surface 61$c$ of the positive current collecting foil 61, which is formed of the aluminum foil and is to be used in step S2 of the positive electrode plate producing step, are coated with $Al_2O_3$ which is an oxide film.

Subsequently, in step S3 of a moisture absorbing step, the positive electrode plate 60 produced in the positive electrode plate producing step is left as it is for 24 hours under an environment of 25° C. with 50% RH. Specifically, the positive electrode plate 60 has been housed for 24 hours in a constant-temperature and constant-humidity container which is kept under a temperature of 25° C. and a humidity of 50% RH so that the positive active material layer 63 of the positive electrode plate 60 absorbs water.

Thereafter, in step S4 of an electrode body producing step, the electrode body 50, which includes the strip-shaped positive electrode plate 60 that has been performed with the moisture absorbing process, the strip-shaped negative electrode plate 70, and the strip-shaped separator 80 interposed between the positive electrode plate 60 and the negative electrode plate 70, is produced. Specifically, in a manner that the separator 80 is interposed between the positive electrode plate 60 and the negative electrode plate 70, the positive electrode plate 60, the negative electrode plate 70, and the separator 80 are wound to configure the electrode body 50 as a wound electrode body (see FIG. 8).

Subsequently, in step S5 of a housing step, the electrode body 50 is housed inside the battery case 30. Specifically, the lid 11 is firstly prepared and the positive electrode terminal member 41 and the negative electrode terminal member 45 are assembled to this lid 11. Thereafter, the positive electrode terminal member 41 assembled to the lid 11 is connected to the positive electrode plate 60 in the electrode body 50. To be more specific, the positive electrode terminal member 41 and the positive electrode plate 60 included in the electrode body 50 are welded. Furthermore, the negative electrode terminal member 45 assembled to the lid 11 is connected to the negative electrode plate 70 in the electrode body 50. To be more specific, the negative electrode terminal member 45 and the negative electrode plate 70 included in the electrode body 50 are welded. Thereby, the lid 11 and the electrode body 50 are integrated by the positive electrode terminal member 41 and the negative electrode terminal member 45.

Figure 9:
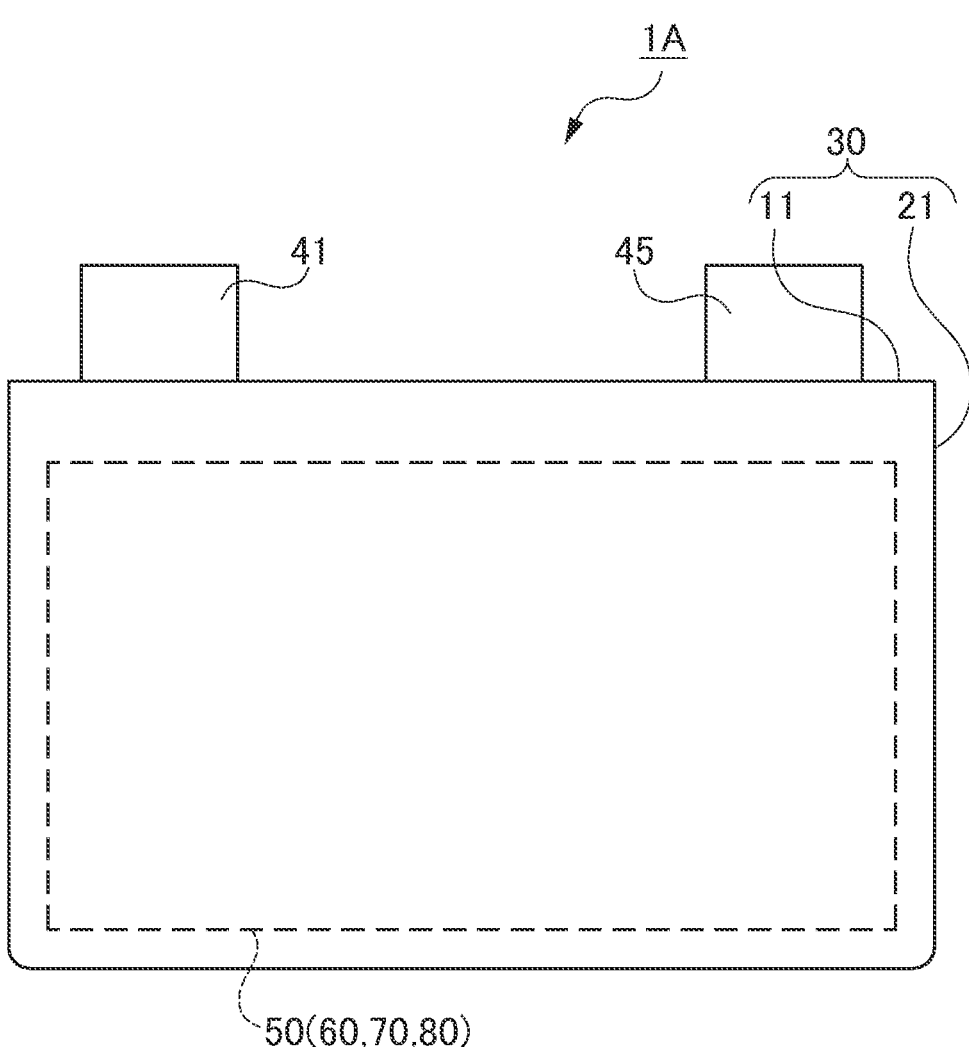
FIG. 9 is an explanatory view for explaining the producing method for the lithium-ion secondary battery.

Subsequently, the electrode body 50 integrated with the lid 11 is housed in the case body 21 and an opening of the case body 21 is closed by the lid 11. In this state, the lid 11 and the case body 21 are welded over the entire circumference. The case body 21 and the lid 11 are thus joined to configure the battery case 30, and thereby an assembly-completed battery 1A is produced (see FIG. 9). The assembly-completed battery 1A is a structure in which the battery case 30, the electrode body 50, the positive electrode terminal member 41, and the negative electrode terminal member 45 are assembled. To be specific, the assembly completed battery 1A is provided with the battery case 30, the electrode body 50 housed in the battery case 30, and the positive electrode terminal member 41 and the negative electrode terminal member 45, which are connected to the electrode body 50 (see FIG. 9).

Subsequently, in step S6 of a drying step, the assembly-completed battery 1A is heated and dried for a predetermined time. Thus, the positive active material layer 63 included in the electrode body 50 of the assembly-completed battery 1A is dried to adjust the water content of the positive active material layer 63 to be within a range from 100 ppm or more to less than 500 ppm. For example, the assembly-completed battery 1A has been dried for 2 hours under the temperature of 100° C. to adjust the water content of the positive active material layer 63 to 102 ppm.

Figure 10:
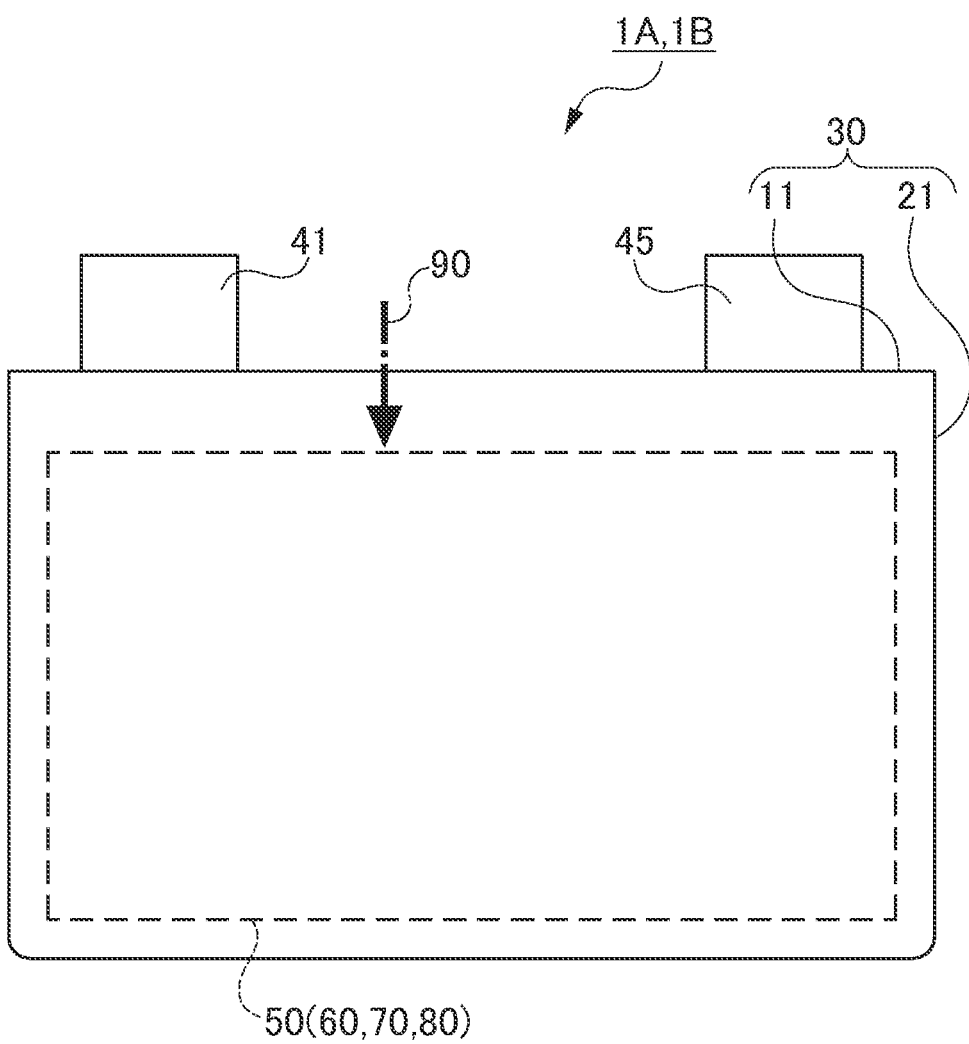
FIG. 10 is another explanatory view for explaining the producing method for the lithium-ion secondary battery.

Subsequently, in step S7 of an injecting step, the non-aqueous electrolytic solution 90 is injected into the battery case 30 housed with the electrode body 50 to produce the injection-completed battery 1B (see FIG. 10). To be specific, the lid 11 of the battery case 30 configuring the assembly-completed battery 1A is formed with a not-shown liquid inlet. The non-aqueous electrolytic solution 90 is injected through this liquid inlet into the battery case 30 configuring the assembly-completed battery 1A (see FIG. 10). Thus, the non-aqueous electrolytic solution 90 is impregnated in the electrode body 50 and the solution 90 is also introduced to a bottom surface side in the battery case 30. Thereafter, the liquid inlet is sealed and the injection-completed battery 1B is produced.

In the present embodiment, the water content (that is, the water content rate) of the positive active material layer 63 is adjusted to be within the range from 100 ppm or more to less than 500 ppm in the step S6 of the drying step directly before the step S7 of the injecting step. As a result of this, in the injecting step of the present embodiment, the non-aqueous electrolytic solution 90 is injected into the battery case 30 which accommodates the electrode body 50 in which the water content of the positive active material layer 63 is within the range from 100 ppm or more to less than 500 ppm.

Subsequently, in step S8 of an initial charging step, the injection-completed battery 1B is initially charged. Thus, the injection-completed battery 1B is activated to become the lithium-ion secondary battery 1. In the initial charging step of the present embodiment, the injection-completed battery 1B has been performed with constant-current charging at a constant current value of 0.2 C until a battery voltage value of the battery 1B reaches 4.1 V (that is, the battery 1B reaches SOC 90%). Thereafter, the lithium-ion secondary battery 1 finished with the initial charging is tested, and then the lithium-ion secondary battery 1 is completed and gets ready for shipment.

In the producing method of the present embodiment, the step S3 of the moisture absorbing step and the step S6 of the drying step correspond to the water content adjusting process. In other words, the water content adjusting process is configured by the step S3 of the moisture absorbing step and the step S6 of the drying step. In the present embodiment, the positive active material layer 63 is made to absorb the water by the amount exceeding a prescribed water content which has been set in advance (that is, a prescribed value) in the step S3 of the moisture absorbing step after the step S2 of the positive electrode plate producing step. Thereafter, in the step S6 of the drying step directly before the step S7 of the injecting step, the excessive water in the positive active material layer 63 is evaporated so that the water content of the positive active material layer 63 is adjusted to be the prescribed value within the range from 100 ppm or more to less than 500 ppm. In this manner, the water content of the positive active material layer 63 at the time of starting the step S7 of the injecting step is made to be within the range from 100 ppm or more to less than 500 ppm.

Heretofore, when a lithium-ion secondary battery, which includes a positive electrode plate provided with a positive active material layer on a surface of a positive current collecting foil formed of an aluminum foil, a negative electrode plate, and non-aqueous electrolytic solution including $LiPF_6$, is applied with high-load energization such as boost charging, there is a case that local points in the positive current collecting foil exhibit high potential. These local points with high potential get corroded to cause liquation of aluminum from surfaces of these points, and the thus liquated aluminum is deposited on a negative electrode surface, which could cause internal short circuit. Specifically, in the lithium-ion secondary battery at the initial stage of use, the coating of $AlF_3$ having high corrosion resistance has not been formed enough on a surface of the positive current collecting foil, which could bring about liquation of aluminum due to the above-mentioned corrosion.

To address this, in the present embodiment, the non-aqueous electrolytic solution 90 is injected in the battery case 30 housed with the electrode body 50, in which the water content (that is, the water content rate) of the positive active material layer 63 is 100 ppm or more, in the step S7 of the injecting step as mentioned above. The injecting step is carried out in a state in which the water content of the positive active material layer 63 is 100 ppm or more, and thus the coating of $AlF_3$ having high corrosion resistance can be easily formed on the first surface 61*b* and the second surface 61*c* of the positive current collecting foil 61 in the following producing process of the battery 1.

To be more specific, the following series of reaction (a) and (b) occurs after injecting the non-aqueous electrolytic solution 90 into the battery case 30 that is housed with the positive electrode plate 60 and others and before—the battery 1 is ready for shipment. Thereby, formation of $AlF_3$ coating on the first surface 61*b* and the second surface 61*c* of the positive current collecting foil 61 is further promoted than the conventional battery. Especially, the following series of reaction (a) and (b) is promoted in the initial charging step, so that formation of $AlF_3$ coating is promoted and the corrosion resistance of the first surface 61*b* and the second surface 61*c* of the positive current collecting foil 61 is improved.

Further, in the conventional producing method, the battery has been produced such that the water included in the positive active material layer is made to be as less as possible, which results in water content of the positive active material layer being far less than 100 ppm. Further, coating of $Al_2O_3$ film as the oxide film is formed on each of the first surface 61*b* and the second surface 61*c* of the positive current collecting foil 61 (specifically, an aluminum foil) used in the step S2 of the positive electrode plate producing step. Accordingly, $Al_2O_3$ coating is also formed on each of the first surface 61*b* and the second surface 61*c* of the positive current collecting foil 61 included in the electrode body 50 which are used in the step S7 of the injecting step.

(a) The non-aqueous electrolytic solution 90 is injected into the battery case 30 in the injecting step, and then $H_2O$ included in the positive electrode plate 60, to be specific, the positive active material layer 63 in the battery case 30 makes reaction with $LiPF_6$ in the non-aqueous electrolytic solution 90, and thus HF is formed.

$$LiPF_6+H_2O \rightarrow LiF+POF_3+2HF \qquad \text{Formula 1:}$$

(b) The thus formed HF makes reaction with the $Al_2O_3$ coating on the first surface 61b and the second surface 61c of the positive current collecting foil 61 to further form a coating of $AlF_3$ on the first surface 61b and the second surface 61c of the positive current collecting foil 61.

$$Al_2O_3+6HF \rightarrow 2AlF_3+3H_2O \qquad \text{Formula 2:}$$

Accordingly, the lithium-ion secondary battery 1 produced as mentioned above has higher corrosion resistance on the first surface 61b and the second surface 61c of the positive current collecting foil 61 than the conventional lithium-ion secondary battery at the time when the battery is completed and gets ready for shipment. Therefore, in the lithium-ion secondary battery 1 produced by the above-mentioned producing method, "liquation of aluminum from the first surface 61b and the second surface 61c of the positive current collecting foil 61 when the high-load energization is performed at the initial stage of use" can be reduced as compared with the conventional lithium-ion secondary battery.

The more the water content is increased in the positive active material layer 63 at the time of the injecting step,— the more easily the $AlF_3$ coating is formed on the first surface 61b and the second surface 61c of the positive current collecting foil 61, and thus the corrosion resistance of the first surface 61b and the second surface 61c of the positive current collecting foil 61 can be improved. However, too much increase in the water content of the positive active material layer 63 causes decline in an initial capacity of the subject lithium-ion secondary battery 1. Specifically, as mentioned below, the water content of 500 ppm or more in the positive active material layer 63 leads to decline in the initial capacity of the lithium-ion secondary battery 1. Accordingly, the water content of the positive active material layer 63 at the time of the injecting step is preferably within the range from 100 ppm or more to less than 500 ppm.

In response to this, in the injecting step of the present embodiment, the non-aqueous electrolytic solution 90 is injected into the battery case 30 housed with the electrode body 50, in which the water content of the positive active material layer 63 is within the range from 100 ppm or more to less than 500 ppm. The lithium-ion secondary battery 1 is produced in this manner, and thus "liquation of aluminum from the first surface 61b and the second surface 61c of the positive current collecting foil 61 when the high-load energization is performed at the initial stage of use" can be reduced and also decline in the initial capacity of the subject battery 1 can be restrained.

Examples 1 to 3

In examples 1 to 3, assembly-completed batteries 1A differ from one another in their drying temperatures in the step S6 of the drying step so that the water content of the positive active material layer 63 in the respective batteries are differentiated. In this manner, the assembly completed batteries 1A in the examples 1 to 3 used in the step S7 of the injecting step are differentiated from one another in their respective water content in the positive active material layers 63. Other than the above-mentioned water content, the lithium-ion secondary batteries 1 of the examples 1 to 3 are produced in a similar way. Herein, the water content of the positive active material layer in the respective examples is measured by a known Karl Fischer moisture titrator.

Specifically, in the example 1, the assembly-completed battery 1A has been dried for 2 hours at the temperature of 100° C. in the step S6 of the drying step to adjust the water content of the positive active material layer 63 to be 102 ppm. Thus, the water content of the positive active material layer 63 becomes 102 ppm as for the assembly-completed battery 1A used in the step S7 of the injecting step. In other words, in the injecting step of the example 1, the non-aqueous electrolytic solution 90 is injected into the battery case 30 housed with the electrode body 50, in which the water content of the positive active material layer 63 is 102 ppm.

In the example 2, the assembly-completed battery 1A has been dried for 2 hours at the temperature of 80° C. in the step S6 of the drying step to adjust the water content of the positive active material layer 63 to be 158 ppm. Thus, the water content of the positive active material layer 63 becomes 158 ppm as for the assembly-completed battery 1A used in the step S7 of the injecting step. In other words, in the injecting step of the example 2, the non-aqueous electrolytic solution 90 is injected into the battery case 30 housed with the electrode body 50, in which the water content of the positive active material layer 63 is 158 ppm.

In the example 3, the assembly-completed battery 1A has been dried for 2 hours at the temperature of 30° C. in the step S6 of the drying step to adjust the water content of the positive active material layer 63 to be 500 ppm. Thus, the water content of the positive material layer 63 becomes 500 ppm as for the assembly-completed battery 1A used in the step S7 of the injecting step. In other words, in the injecting step of the example 3, the non-aqueous electrolytic solution 90 is injected into the battery case 30 housed with the electrode body 50, in which the water content of the positive active material layer 63 is 500 ppm.

Comparative Example 1

In the comparative example 1, the assembly-completed battery 1A has been dried for 2 hours at the temperature of 110° C. in the step S6 of the drying step to adjust the water content of the positive active material layers 63 to be 68 ppm. Thus, the water content of the positive active material layer 63 becomes 68 ppm as for the assembly-completed battery 1A used in the step S7 of the injecting step. In other words, in the injecting step of the comparative example 1, the non-aqueous electrolytic solution 90 is injected into the battery case 30 housed with the electrode body 50, in which the water content of the positive active material layer 63 is 68 ppm. The lithium-ion secondary battery of the comparative example 1 is produced as similar to the example 1 other than the above-mentioned water content matter.

<High-Load Energization Test>

Next, the lithium-ion secondary batteries according to the examples 1 to 3 and the comparative example 1 are performed with high-load energization test. The lithium-ion secondary batteries used for the subject test are lithium-ion secondary batteries that have been completed and got ready for shipment as unused items, namely new products. Therefore, for the lithium-ion secondary batteries to be used for the subject test, the high-load energization in the subject test represents the high-load energization at the initial stage of use of those batteries.

In the subject test, 20 cycles of charge and discharge were performed with the following charge and discharge as one cycle under the temperature environment of 25° C. in the respective lithium-ion secondary batteries. To be more specific, one cycle of the charge and discharge is as follows. Firstly, each battery is charged until SOC reaches 80% (that is, the battery voltage value of 4.0 V) at a current value of 1 C. Thereafter, the battery is discharged at a current value of 0.2 C until the SOC reaches 15% (that is, a battery voltage value of 3.5 V). The battery is thereafter left suspended for 8 hours. This charge and discharge cycle is defined as one cycle, and 20 cycles—of charge and discharge are carried out.

The respective lithium-ion secondary batteries are applied with the above-mentioned 20 cycles of the charge and discharge, and then presence and absence of aluminum liquation from the first surface 61b and the second surface 61c of the positive current collecting foil 61 is studied for the respective batteries. Specifically, after performing 20 cycles of the charge and discharge, the respective lithium-ion secondary batteries are disassembled to take out the positive electrode plates. The thus taken positive electrode plates are each impregnated in ethyl methyl carbonate for 10 minutes and then dried so that component of the non-aqueous electrolytic solution 90 attached to the positive electrode plate is removed. Thereafter, the positive active material layer is separated from the positive current collecting foil 61 of this positive electrode plate to expose the first surface 61b and the second surface 61c of the positive current collecting foil 61. Then, the first surface 61b and the second surface 61c of the positive current collecting foil 61 are observed by a microscope to confirm presence or absence of pitting corrosion. Herein, the pitting corrosion is caused by aluminum liquation from the first surface 61b and the second surface 61c of the positive current collecting foil 61. Accordingly, from the presence or absence of the pitting corrosion, presence or absence of the aluminum liquation can be determined. Results of this test is shown in a table 1. In the table 1, the pitting corrosion is indicated as "Al pitting corrosion."

TABLE 1

|  | Water Content (ppm) | Al Pitting Corrosion | Initial Capacity |
|---|---|---|---|
| Example 1 | 102 | NO | Good |
| Example 2 | 158 | NO | Good |
| Example 3 | 500 | NO | Fine |
| Comparative Example 1 | 68 | YES | Good |

As shown in the table 1, in the examples 1 to 3, no pitting corrosion exist on the first surface 61b and the second surface 61c of the positive current collecting foil 61. This result proves that the respective lithium-ion secondary batteries 1 in the examples 1 to 3 can prevent liquation of aluminum from the first surface 61b and the second surface 61c of the positive current collecting foil 61 when the high-load energization is performed at the initial stage of use. Accordingly, the lithium-ion secondary batteries 1 in the examples 1 to 3 are defined as lithium-ion secondary batteries which are difficult to generate liquation of aluminum from the first surface 61b and the second surface 61c of the positive current collecting foil 61 when the high-load energization is performed at the initial stage of use.

On the other hand, in the comparative example 1, the pitting corrosion exists on the first surface 61b and the second surface 61c of the positive current collecting foil 61. Therefore, the lithium-ion secondary battery of the comparative example 1 is defined as a lithium-ion secondary battery which is easy to generate liquation of aluminum from the first surface 61b and the second surface 61c of the positive current collecting foil 61 when the high-load energization is performed at the initial stage of use.

From the above results, it is possible to produce the lithium-ion secondary battery that achieves reduction in "liquation of aluminum from the surface of the positive current collecting foil when the high-load energization is performed at the initial stage of use" by injecting the non-aqueous electrolytic solution 90 into the battery case 30 housed with the electrode body 50, in which the water content (water content rate) of the positive active material layer 63 is 100 ppm or more, in the step S7 of the injecting step. Therefore, the producing method of the present embodiment is a producing method of a lithium-ion secondary battery achieving reduction in "liquation of aluminum from a surface of a positive current collecting foil when high-load energization is performed at an initial stage of use."

<Initial Capacity Measurement Test>

The respective lithium-ion secondary batteries in the examples 1 to 3 and the comparative example 1 are measured with their initial capacities. The lithium-ion secondary batteries used for the subject test are all the lithium-ion secondary batteries which are completed and get ready for shipment, namely, unused items (new products). Specifically, the respective lithium-ion secondary batteries are charged at a current value of 0.2 C until a battery voltage value reaches 4.2 V. Thereafter, charging is kept performed while maintaining the battery voltage value as 4.2 V so that the SOC reaches 100%. Then, the batteries are discharged at the current value of 0.2 C until the battery voltage value falls to 3.0 V. Thereafter, discharging is kept performed while maintaining the battery voltage value as 3.0 V so that the SOC reaches 0%. At this time, the discharge electric quantity from the SOC 100% to the SOC 0% is measured as the initial capacity of the respective lithium-ion secondary batteries. Each initial capacity of the respective lithium-ion secondary batteries is evaluated, and the results are shown in the table 1.

As indicated as "Good" in the table 1, the lithium-ion secondary batteries in the examples 1 and 2, and the comparative example 1 can exhibit adequate initial capacity. Specifically, the initial capacity in the comparative example 1 is the largest, the example 1 is the second largest, and the example 2 is the third largest. In more detail, the initial capacities of the lithium-ion secondary batteries in the examples 1 and 2 are smaller than the initial capacity of the lithium-ion secondary battery in the comparative example 1, but the decline level is just a little.

On the other hand, as indicated as "Fine" in the table 1, the lithium-ion secondary battery in the example 3 is smaller in the initial capacity than the lithium-ion secondary battery in the comparative example 1, and the decline level is larger than those of the lithium-ion secondary batteries in the examples 1 and 2. These results have proved that the larger the water content of the positive active material layer 63 becomes at the time of the injecting step, the smaller the initial capacity of the lithium-ion secondary battery becomes. When the water content is made to be 500 ppm or more, it has been confirmed that the initial capacity of the lithium-ion secondary battery largely decreases.

The above results of the high-load energization test and the initial capacity measurement test have proved that the water content of the positive active material layer 63 in performing the injecting step is preferably within the range from 100 ppm or more to less than 500 ppm. To be specific, from the results of the high-load energization test, by adjusting the water content of the positive active material layer 63 in performing the injecting step to be 100 ppm or more, it is possible to obtain the effect of restraining liquation of aluminum from the positive current collecting foil 61. However, from the results of the initial capacity measurement test, it is confirmed that 500 ppm or more of the water content of the positive active material layer 63 in performing the injecting step causes large decline in the initial capacity of the lithium-ion secondary battery. Therefore, it is further preferable to adjust the water content of the positive active material layer 63 in performing the injecting step to be within the range from 100 ppm or more to less than 500 ppm.

As mentioned above, the present disclosure has been explained along with the embodiment, but the present disclosure is not limited to the above-mentioned embodiment and may be appropriately modified without departing from the scope of the disclosure.

REFERENCE SIGNS LIST

1 Lithium-ion secondary battery
1A Assembly-completed battery
1B Injection-completed battery
30 Battery case
50 Electrode body
60 Positive electrode plate
61 Positive current collecting foil
63 Positive active material layer
63P Positive electrode paste
64 Positive active material particles
65 Binder
66 Conductive material
69 Solvent
70 Negative electrode plate
90 Non-aqueous electrolytic solution

What is claimed is:

1. A producing method for a lithium-ion secondary battery comprising a positive electrode plate provided with a positive active material layer on a surface of a positive current collecting foil formed of an aluminum foil, a negative electrode plate, non-aqueous electrolytic solution including $LiPF_6$, and a battery case to house the positive electrode plate, the negative electrode plate, and the non-aqueous electrolytic solution, the producing method including:

positive-electrode-plate producing of producing the positive electrode plate having the positive active material layer on the surface of the positive current collecting foil;

electrode-body producing of producing an electrode body provided with the positive electrode plate and the negative electrode plate;

housing the electrode body in the battery case;

water-content adjusting of adjusting a water content of the positive active material layer to be within a range from 100 ppm or more to less than 500 ppm after the housing;

injecting the non-aqueous electrolytic solution into the battery case housed with the electrode body to produce an injection-completed battery; and initial charging of initially charging the injection-completed battery, wherein the injecting is to inject the non-aqueous electrolytic solution into the battery case housed with the electrode body, in which the water content of the positive active material layer is within the range of from 100 ppm or more to less than 500 ppm.

2. The producing method for the lithium-ion secondary battery according to claim 1, including a moisture absorbing of allowing the positive active material layer of the positive electrode plate to absorb water after the positive electrode plate producing.

* * * * *